(12) United States Patent
Escobedo et al.

(10) Patent No.: US 10,843,594 B2
(45) Date of Patent: Nov. 24, 2020

(54) ADJUSTABLE SEAT WITH ENTRY TIP SLIDE PLUS PITCH SLIDE

(71) Applicant: Adient Engineering and IP GmbH, Burscheid (DE)

(72) Inventors: Aaron Escobedo, Northville, MI (US); William S. Brewer, Plymouth, MI (US); Kurt Seibold, Farmington Hills, MI (US); Karl Noffz, Plymouth, MI (US)

(73) Assignee: Adient Engineering and IP GmbH, Burscheid (DE)

( * ) Notice: Subject to any disclaimer, the term of this patent is extended or adjusted under 35 U.S.C. 154(b) by 0 days.

(21) Appl. No.: 16/475,994

(22) PCT Filed: Jan. 5, 2018

(86) PCT No.: PCT/US2018/012529
§ 371 (c)(1),
(2) Date: Jul. 3, 2019

(87) PCT Pub. No.: WO2018/129283
PCT Pub. Date: Jul. 12, 2018

(65) Prior Publication Data
US 2019/0366879 A1 Dec. 5, 2019

Related U.S. Application Data

(60) Provisional application No. 62/442,616, filed on Jan. 5, 2017.

(51) Int. Cl.
*F16M 13/00* (2006.01)
*B60N 2/08* (2006.01)
(Continued)

(52) U.S. Cl.
CPC ............ *B60N 2/0825* (2013.01); *B60N 2/123* (2013.01); *B60N 2/07* (2013.01); *B60N 2/20* (2013.01);
(Continued)

(58) Field of Classification Search
CPC ........ B60N 2/0825; B60N 2/123; B60N 2/07; B60N 2/0725; B60N 2/20
(Continued)

(56) References Cited

U.S. PATENT DOCUMENTS

| | | | |
|---|---|---|---|
| 2010/0052390 A1* | 3/2010 | Dagcioglu | B60N 2/3031 297/324 |
| 2010/0109404 A1* | 5/2010 | Yamagishi | B60N 2/3065 297/341 |
| 2011/0043020 A1* | 2/2011 | Nakane | B60N 2/3065 297/354.1 |

* cited by examiner

Primary Examiner — Todd M Epps
(74) Attorney, Agent, or Firm — Marshall & Melhorn, LLC (57) ABSTRACT

A seat mounted on a slide slidable on a track. The track has comfort and entry zones. Pitch linkage mounts on the slide and supports a seat back. The linkage pivotally connects a seat back to the slide between recline and forward positions. A track latch fixes the slide to the track in a plurality of positions in the comfort zone. The entry zone is used to enter the vehicle. A forward stop blocks the slide from moving from the comfort to the entry zone. The forward stop moves between stop and release positions. The stop position blocks the slide from moving from the comfort to the entry zone. The release position does not block the slide from moving. A forward stop mechanism moves the forward stop into the stop position when the pitch linkage is in the recline position and the slide is in said comfort zone.

11 Claims, 12 Drawing Sheets

(51) Int. Cl.
  *B60N 2/12* (2006.01)
  *B60N 2/90* (2018.01)
  *B60N 2/07* (2006.01)
  *B60N 2/20* (2006.01)
  *B60N 2/36* (2006.01)

(52) U.S. Cl.
  CPC .. *B60N 2002/363* (2013.01); *B60N 2002/957* (2018.02)

(58) Field of Classification Search
  USPC .................. 248/429, 424; 296/65.13, 65.15
  See application file for complete search history.

ADJUSTABLE SEAT WITH ENTRY TIP SLIDE PLUS PITCH SLIDE

CROSS REFERENCE TO RELATED APPLICATIONS

This application claims the benefit of priority of U.S. provisional application 62/442,616, filed Jan. 5, 2017, the entire contents of which are incorporated herein by reference.

FIELD OF THE INVENTION

The present invention relates to the field of seats, and in particular to seats where the entire seat is adjustable forward and backward, and the seat back is pivotally connected to a seat cushion, especially automotive seats.

BACKGROUND OF THE INVENTION

In many applications, such as in vehicles, it is desirable to incorporate as many seats as possible, while still maintaining the occupant or passenger comfort. When a passenger/occupant is sitting in a seat, the seats in front of and behind the present seat can be placed relatively close to each other. Difficulties arise when providing access to the plurality of seats. Further difficulties arise if many seats are arranged in a vehicle, and some of those seats are spaced from an access point into and out of the vehicle, such as a door.

An example of such a situation, is in the case of a two-door vehicle with two rows of seats, and/or a four-door vehicle with three rows of seats. The doors, for various reasons, are often not large enough to permit full access to all the rows of seats in the vehicle, for example the second row of seats in a two-door vehicle, or the third row of seats in a four-door vehicle. To overcome this difficulty, the seat next to the door is often made to move to allow easier access/more room to the row of seats that are not adjacent the door. In particular, the seat adjacent the door can be moved away from the row with limited access, and especially the seat back can be pitched forward, giving easier access to the rearward row that has limited access. When access to the row with limited access is no longer desired, the seat adjacent the door is then moved into a position of comfort for the occupant of that state. In particular the entire seat is then usually moved closer to the rearward row with the limited access, and the seat back is moved into a more reclined position.

It is desirable that the mechanisms used for controlling all of these movements of the seat have sufficient strength to protect the occupants of the seat during collisions, be compact to allow more space inside the vehicle for the passenger comfort and to increase the efficiency of the vehicle, and to be easy for the occupants/passengers of the vehicle to operate.

SUMMARY OF THE INVENTION

It is an object of the present invention to provide a adjustment mechanism for a seat that controls when, where, and how the forward and rearward position can be adjusted, as well as when, where and how the seat back can be pivotally positioned. It is a further object of the present invention to have this adjustment mechanism be compact, reliable, and economical.

The track, the slide and the adjusting mechanism(s)s provide a standard design solution for achieving desired seat track function. Functions that are incorporated are:
 A. a switchable front/forward comfort end stop to prevent the track/slide from going into the access/entry zone during normal seat comfort adjustment;
 B. holding the track latch open in the access/entry zone;
 C. locking of the seat back in the pitch forward position until the seat track latch is in a lockable position;
 D. a switchable rearward position end stop to stop the seat track/slide rearward motion into a preset comfort zone before the track full rear slide position.

In the present invention, the seat and seat back are supported on a slide, and the slide is slidable on a track. The slide travels along the track in two zones, a comfort zone and an access/entry zone. In the comfort zone, the slide can be fixed to the track in a plurality of track positions by a track latch. The occupant of the seat moves a track adjustment bar to unlatch the slide from the track, and then moves the seat forward and backward until a comfortable position is found. The occupant then releases the track adjustment bar and the track latch fixes the slide to the track in the nearest track latch position.

Forward of the comfort zone is the access/entry zone. The seat is movable into this access zone to provide better or easier access to seats, or rows of seats that are behind the present seat, and usually are further away from a door of the vehicle. Positioning of the present seat in this access zone is usually not comfortable for the occupant, and is only used when there is no occupant in the present seat, and easier access is desired for the more rearward seats.

In order to further make it easier to access the rearward seat, the seat back is pivotally connected to the slide through a pitch link between a reclined position that supports the back of the occupant in a predominantly vertical position. The exact angular position of the seat back can be adjustable for the comfort of the occupant. When easier access to the rearward seat(s) is desired, the seat back can be pitched forward to a greater extent, usually past completely vertical, and then onward and downward toward the seat base/cushion. This then provides more room for entry into the rear seat. The pitched forward position of the seat back is usually not comfortable for the occupant and is only used when there is no occupant in the present seat.

The present invention has a forward stop which selectively prevents/blocks the slide from moving from the comfort zone to the access zone. When it is desired to move the seat from the comfort zone to the access zone, the seat back is moved into the pitched forward position. During normal operation of the seat in a vehicle, the seat back is usually locked into its reclined position. A manual release is operated by an operator to unlock the seat back from the reclined position, and then the operator can manually move the seat back into the pitched forward position.

When the seat back is moved into the pitched forward position, there is a forward stop mechanism between the forward stop and the seat back that causes the forward stop to move into a state/position where it will not block the slide from moving into the access zone. Correspondingly when the seat back is in the pitched forward position, there is a track latch mechanism which unlocks the track latch so that the slide is not locked to the track in one of the track positions. The seat, with the seat back pitched forward, can then move from the comfort zone to the access zone.

When the seat back is in the pitched forward position, a pitch lock is moved into a position/state where the seat back is locked into the pitched forward position. The pitch lock preferably includes a pitch lock cam and a pitch obstacle. When it is desired to return the seat to a comfort state where it can be sat in by the occupant, the entire seat is slid rearward by sliding the slide on the track. The slide slides from the access zone into the comfort zone. Before the slide reaches the rearmost end of the comfort zone, preferably a middle of the comfort zone, the pitch lock cam encounters the pitch obstacle. This pitch obstacle interacts with the pitch lock cam, and moves the pitch lock cam into a position/state where the seat back is unlocked, and is free to pivot.

A rearward stop is also provided which selectively stops rearward motion of the slide. The rearward stop stops the motion of the slide at a point/location to the rear of the point where the pitch lock unlocks the seat back. The rearward stop is in a blocking state when the seat back is in the pitched forward position. The rearward stop is in an un-blocking state when the seat back is in the reclined position. As the seat is moved rearward from the access zone to the comfort zone, and then further rearward, the pitch lock cam catches the pitch obstacle and unlocks the seat back. As the slide is slid further rearward, the rearward stop has a hook that engages with a rearward obstacle. This then stops the rearward movement of the seat. The momentum of the seat back at this stopping point helps move the seat back from the pitched forward position to the reclined position.

Now that the seat back is in the reclined position, the rearward stop moves to the unblocking state, and no longer blocks rearward movement of the slide. The track latch is also moved/released by the pitch link into a state where it locks the slide to the track in a plurality of positions and is under manual control. The forward stop is also moved into a state where it blocks movement of the slide from the comfort zone into the access zone.

All these functions are incorporated into a slide and track arrangement that can be incorporated into many different seats. Previous design solutions for some similar seat functions have utilized separate mechanisms for each function packaged in different areas of the seat, only functionally related to each other by the position of the seat. Having separate mechanisms in various places on the seat structure adds to the tolerance variation for the overall sequential operation of the seat system. Having separate mechanisms packaged in various positions on the seat adds to the application complexity.

Current design solutions do not achieve a robust entry return position stop forward of the track full rear position. Typically if the slide/seat returns to the full rear adjusted position before un-pitching or un-tipping the seat back, the seat interferes with the third row occupant.

The design solution is a modular design solution that incorporates all targeted functions that can be actuated by both seat pitching and seat back tip with the changing/moving of a single component. All functions are incorporated into a single mechanism. The mechanism function is controlled by rotation of a single part, ensuring the relationship of the functions is maintained with minimal variation. A locking cam locks the master function rotating part into the pitched (or tipped) position until the seat track returns to the intended longitudinal adjustment position to allow the seat to return to the seatable position. By having a mechanism that incorporates all functions into a single unit the packaging of the design solution is simplified. The mechanism is located in the track latch area under the seat toward the centerline of the seat, which is typically available package space. The design solution incorporates a hard stop for the track return position that is engaged until the seat is un-pitch (or un-tipped).

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
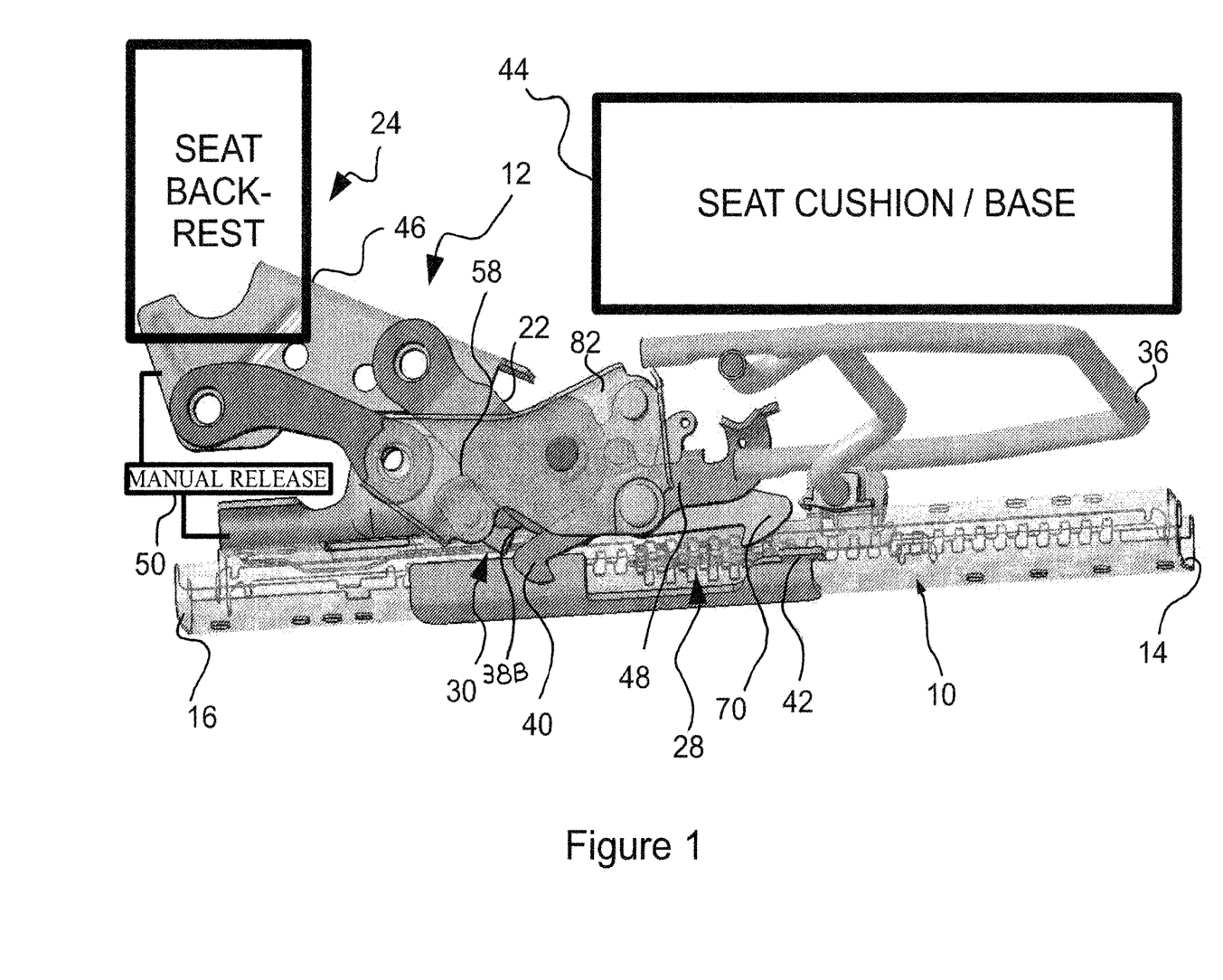
FIG. 1 is a schematic side view of the seat mechanism with the slide in the comfort zone and the seat back in the reclined position.

Referring to the drawings in particular, FIG. 1 shows a schematic side view of a portion of a seat, in particular a vehicle seat, such as for an automobile. This seat is preferably adjacent to the door of the automobile, and this seat is movable to a relatively large degree in order to allow easier access to other seats of the automobile. While many seats are movable to some degree to increase passenger/occupant comfort, this present seat adjacent the door is made more movable than for just comfort, in order to increase access to the other seats. The present seat has a seat horizontal cushion/base 44 for vertically supporting the occupant, and a seat backrest 46 for supporting the back of the occupant. The seat cushion 44 and seat back rest 46 are shown schematically, and can be of many different known shapes and designs.

The seat cushion/base 44 is mounted to the floor of the vehicle through a slide 12 and a track 10. The seat back rest 46 is pivotally connected to the slide 12. The slide 12 is movably mounted on the track 10 to slide in the longitudinal direction of the track 10. The track 10 has a first longitudinal end 14 and a second longitudinal end 16. The front of the seat is considered to be the end or side of the seat diametrically opposite to the back rest 46, or the end or side of the seat furthest in the forward direction of the occupant. The first longitudinal end 14 therefore can be considered the forward end, and a second longitudinal end 16 can be considered the rearward end. The forward direction being from the middle of the seat toward the first longitudinal end 14, and the rearward direction being from the middle of the seat toward the second longitudinal end 16.

Figure 2:
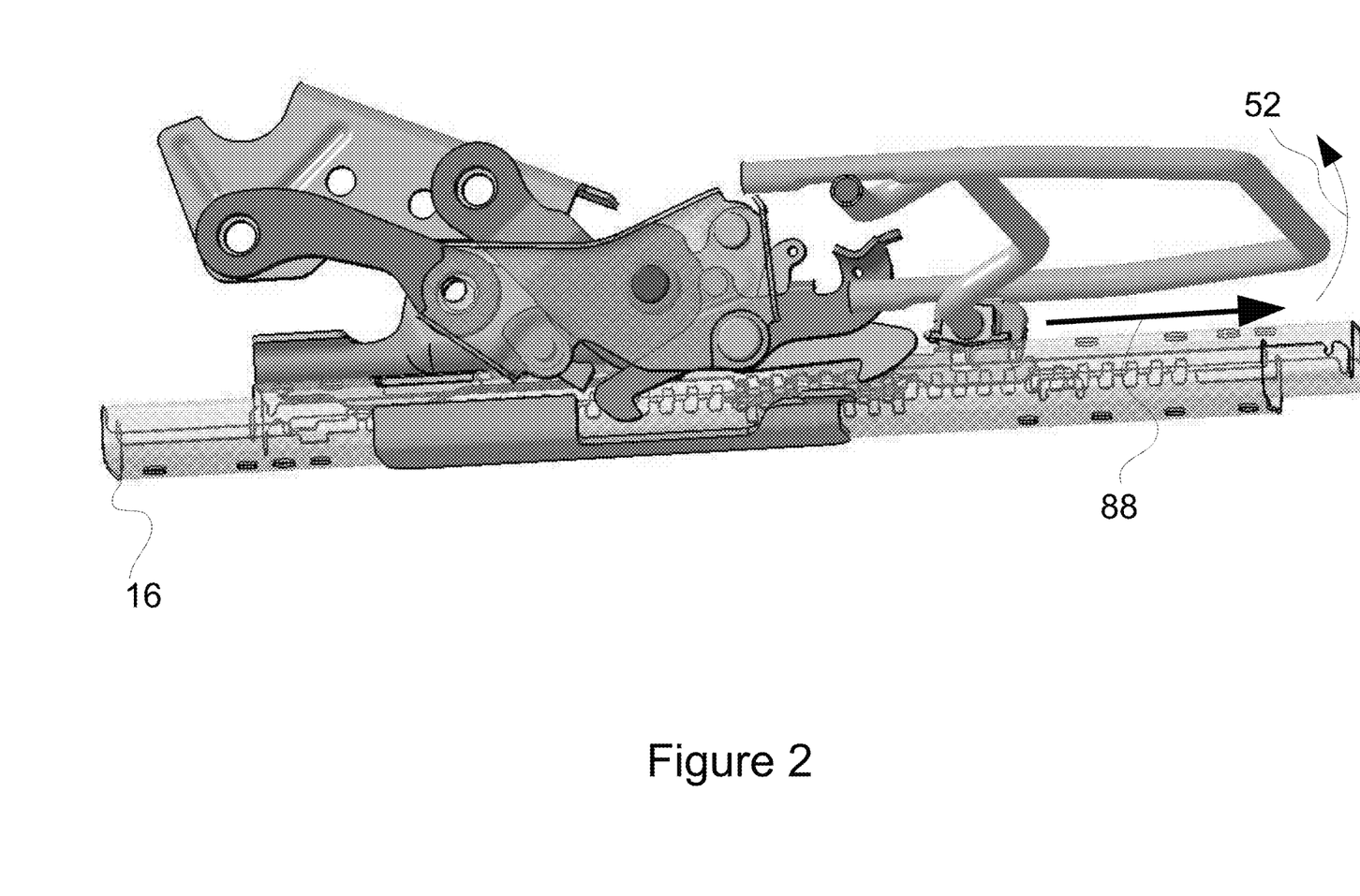
FIG. 2 is another schematic side view of the seat mechanism with the slide in the comfort zone, but further forward than in FIG. 1.

The slide 12 slides along the track 10 to position the seat in a plurality of positions along an overall travel length, both for the comfort of the occupant, the comfort of the occupant in a rearward row, and to position the seat for easier access to a rearward row. When the seat is adjusted to a position for a sitting occupant, especially a sitting occupant of the seat, there is provided a plurality of track positions in a comfort zone or range of the travel length. This comfort zone is usually a rearmost portion of the overall travel length. A track latch 28 fixes the slide 12 to the track 10 at one of the plurality of track positions. The track latch 28 in a preferred embodiment, has at least one tooth 84 that is movable into and out of engagement with a plurality of slots 86 in order to fix the slide 12 to the track 10. The tooth 84 is movable into and out of the plurality of slots 86 by a track latch adjustment bar 36. The track latch adjustment bar 36 is often called a track latch comfort adjustment towel bar, because of its resemblance to a bar for holding towels. The occupant can reach under the front of the seat, grasp and move the track latch adjustment bar 36 in the direction 52 to release the track latch 28, and then slide the seat forward or rearward to a position of comfort. The occupant then releases the track latch adjustment bar 36 which causes the tooth, or more preferably teeth 84, of the track latch 28 to engage with a corresponding slot or slots 86, and fix the slide 12 relative to the track 10. FIG. 1 shows the slide 12 in one track position in the comfort zone, and FIG. 2 shows the slide 12 in a more forward position in the comfort zone.

Figure 3:
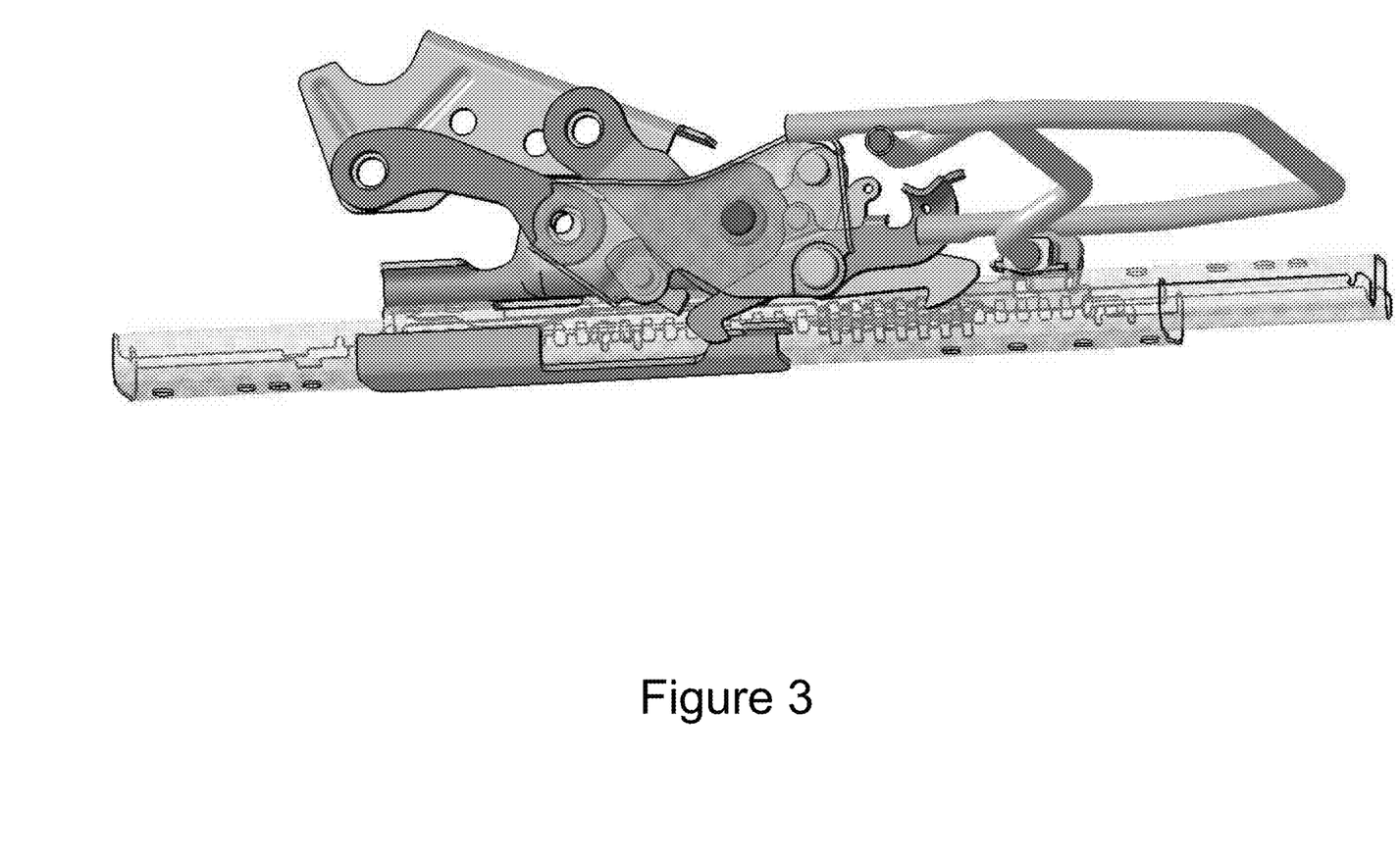
FIG. 3 is a schematic side view of the slide mechanism with the slide at the furthest forward position of the comfort zone, and with the forward stop blocking further forward movement.

When access to rearward seats or rows is desired, it is beneficial to move the seat much more forward than would normally be desired for the comfort of the seat occupant. The present invention provides an additional travel length of the slide 12 more forward than the comfort zone. This additional travel length is considered to be an entry/access zone portion of the overall travel length of the slide 12 on the track 10. This entry zone portion is arranged forward of the comfort zone. A forward stop 32, FIG. 3, is provided to selectively block and unblock movement of the slide from the comfort zone into the entry zone. This is desirable because often an occupant of the seat would find positioning of the seat in the entry zone to be uncomfortable and would not want the seat to unintentionally move into the entry zone. Positioning the seat that far forward may harm the occupant sitting in the seat.

The forward stop 32, in the preferred embodiment, includes a forward stop hook 40 and a forward stop obstacle 42. The forward hook 40 is part of a forward rocker 48 that pivots. When the seat back 46 is in the reclined position as in FIGS. 1-3, the forward stop 32, and especially the forward hook 40, is in the state or position where it is able to block movement of the slide from the comfort zone to the entry zone. In FIGS. 1-3, the forward hook 40 and the associated rocker 48 are in the lowered or more counter-clockwise position. As the slide 12 is slid in the forward direction 88 towards the entry zone, the forward hook 40 engages the forward obstacle 42, and prevents the slide 12 from entering/ moving into the entry zone, even if the track adjustment bar 36 moves the track latch 28 into a release position or release state.

Figure 4:
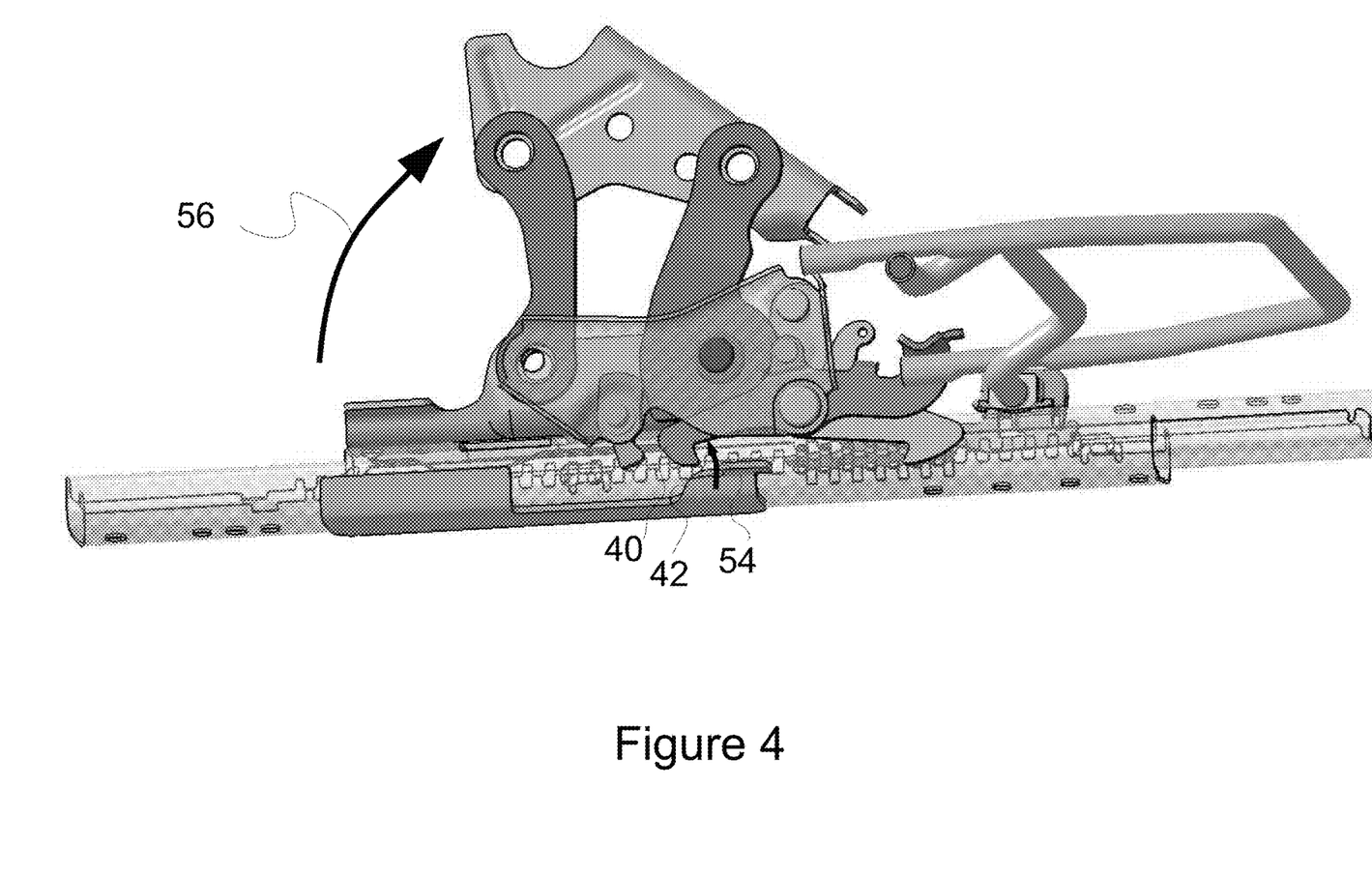
FIG. 4 is a schematic side view of the seat mechanism with the seat back/pitch linkage moving from the reclined position to the pitched forward position.
Figure 5:
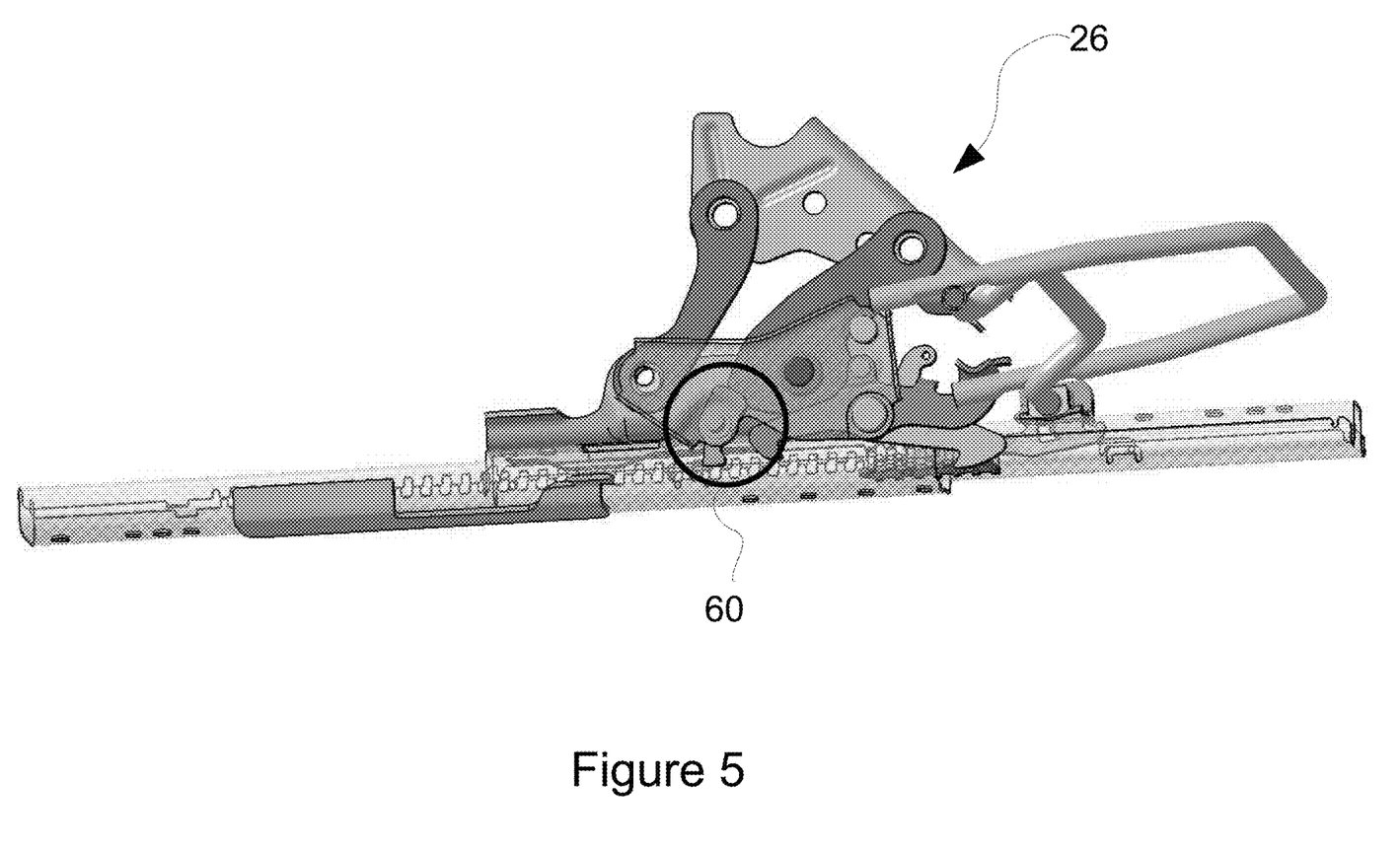
FIG. 5 is a schematic side view of the seat mechanism with the pitch linkage in the pitched forward position and the slide in the entry zone.
Figure 6:
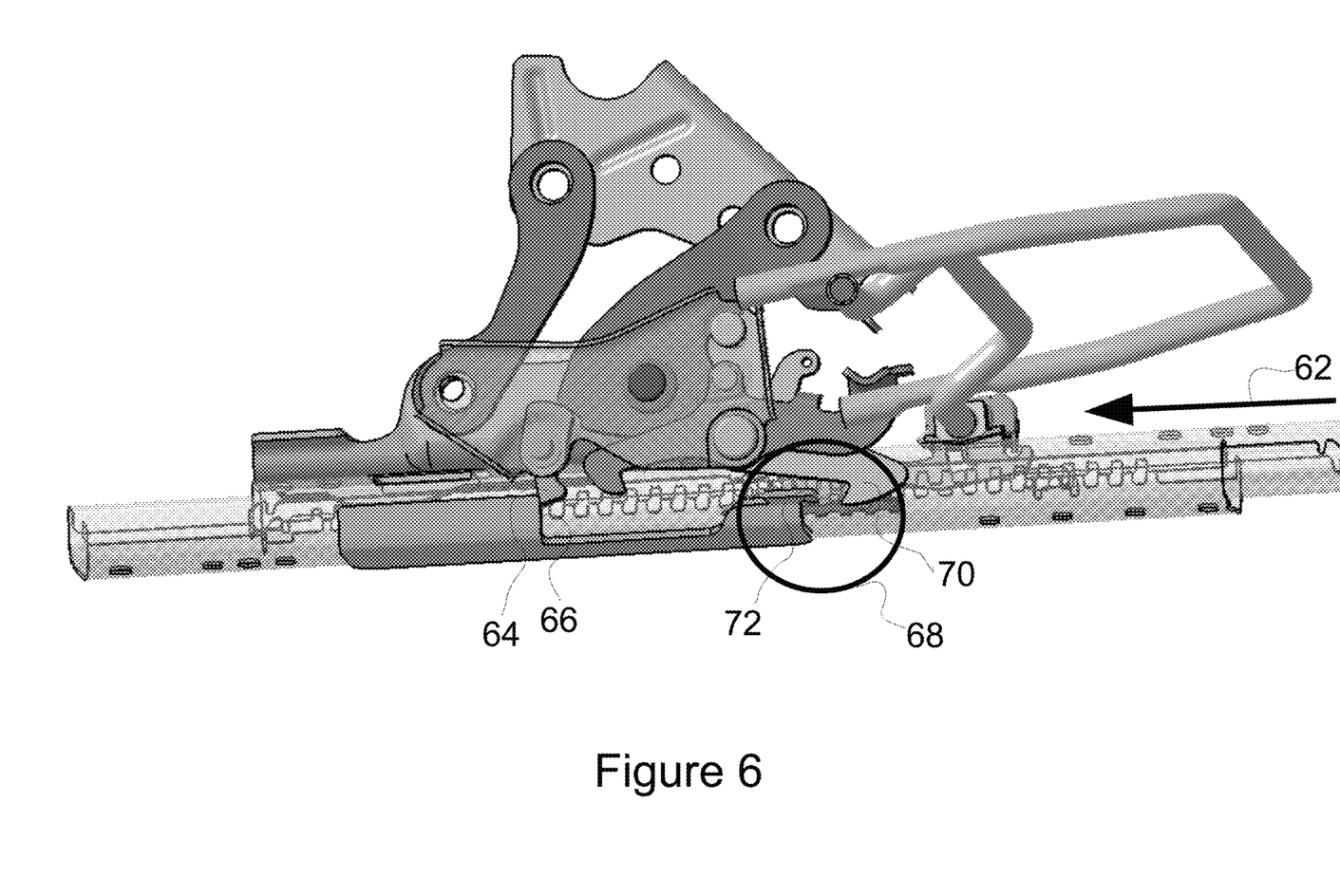
FIG. 6 is a schematic side view of the seat mechanism with pitch linkage in the pitched forward position and the slide moved back into the comfort zone.

In many vehicles, it is preferable that the seat back 46 be selectively lockable into the reclined position, or seating comfort position, as shown in FIG. 1. This locking in the reclined position is often done for safety so that in the event of a collision, the seat back 46 does not force the occupant of the seat forward. A manual seat back release 50 is provided, usually by a known seat back release lever, cable and fixing device to allow an operator to manually and rotationally unlock the seat back 46 from the seat base 44. When access to a seat behind the present seat is desired, the operator moves the seat back release lever, and then pushes the seat back 46 from the reclined position to the pitched forward position. This moves the pitch linkage 22. FIGS. 1-3 and 7 show the pitch linkage 22 in the reclined position. FIGS. 4-6 show the pitch linkage 22 in the pitched forward position.

Figure 9:
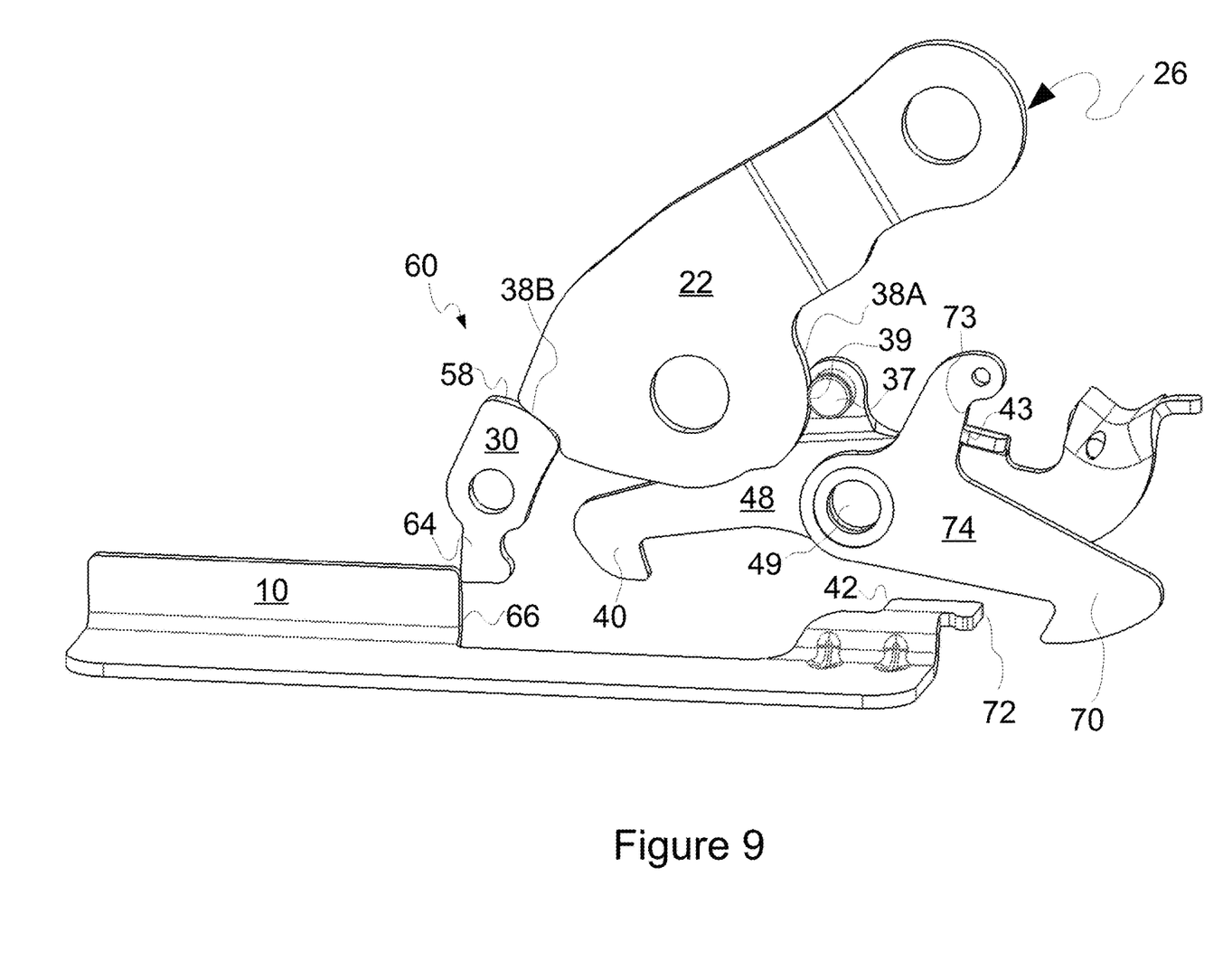
FIG. 9 is a view of the forward stop, rearward stop, pitch link and pitch lock.

The forward stop 32 blocks forward movement 88 of the slide from the comfort zone into the entry zone when the pitch linkage 22 is in the reclined position 24, even if the track latch 28 is in the released state. When it is desired to move the seat into the entry zone, the pitch linkage 22 is moved from the reclined position 24 into the forward position 26. Movement 56 of the pitch linkage 22 from the reclined position 24 into the forward position 28, is shown in FIG. 4. This movement of the pitch linkage causes the forward rocker 48 to rotate in a clockwise direction 54 thus lifting the forward hook 40 so that it clears the forward obstacle 42, as shown in FIG. 4. A forward stop mechanism is provided between the pitch linkage 22 and the rocker 48 to affect this movement. Preferably, as shown in FIG. 9, the pitch linkage 22 has a first control profile/cam surface 38A which contacts a first rocker surface 39 of the forward rocker 48. The first rocker surface 39 is preferably embodied on a forward rocker pin 37 of the forward rocker 48, which causes the forward rocker 48 to pivot about a forward rocker pivot point 49 to affect the movement of the hook 40 out of an engagement position with the obstacle 42. Other embodiments of the forward stop mechanism are possible, such as pins, grooves, gears, cables, pushrods, etc.

When the pitch linkage 22 is moved from the reclined position 24 into the pitched forward position 26, the pitch linkage 22 also moves the track latch 28 from the latched position to the unlatched position. Now with the seat back 46 in the pitched forward position, the forward stop hook 40 is lifted and will not engage the forward obstacle 42. Also the track latch 28 is unlatched. The slide 12 is then free to slide from the comfort zone into the access zone. This can be done by the operator manually pushing the seat forward.

The pitch linkage is in the pitched forward position 28 in FIG. 5. In this pitched forward position 28, a pitch lock/mechanism 30 blocks movement of the pitch linkage 22 from the forward position 28 to the reclined position 24. The pitch mechanism 30 preferably is a pitch lock cam with a pitch cam surface 58 that interacts with a second pitch link control profile/cam surface 38B to block movement of the pitch linkage 22 from the forward position 28 to the reclined position 24. In the embodiment of the present drawings, the pitch lock cam surface 58 is biased in the clockwise direction so that when the pitch linkage 22 moves into the pitched forward position 26, the pitch cam surface 58 moves into a lock position 60 where it interlocks with the second control profile 38B to block return movement of the pitch linkage 22. This biasing in the lock state and clockwise direction can be provided by a spring, or the pitch mechanism 30 can be weighted to have an equilibrium position into which the pitch mechanism moves to when the pitch linkage 22 is in the forward position 28.

Figure 7:
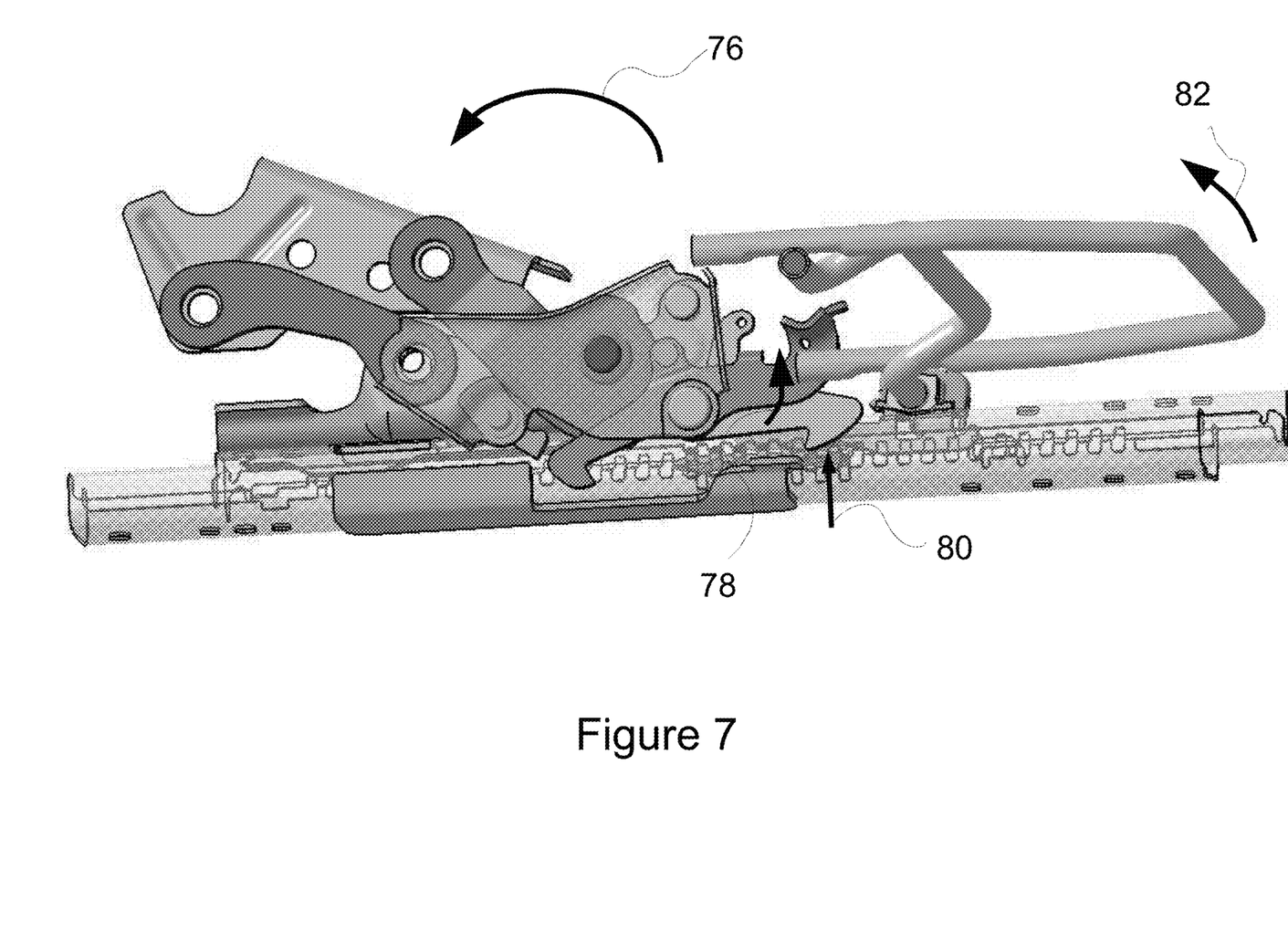
FIG. 7 is a schematic side view of the seat mechanism with the slide in the comfort zone and the seat back/pitch linkage moving from the pitched forward position into the reclined position.
Figure 8:
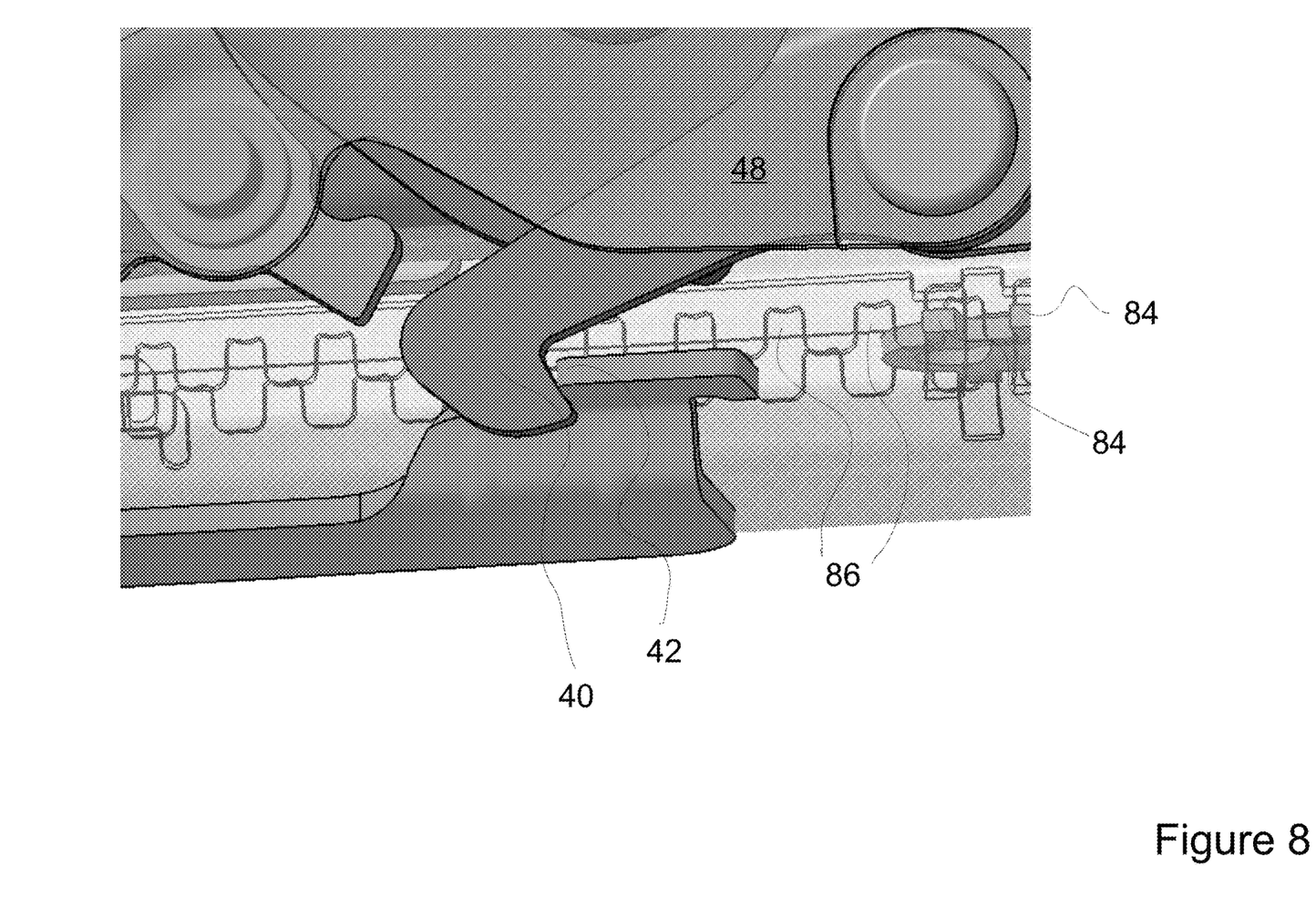
FIG. 8 is an enlarged view of the forward stop look and the forward stop obstacle as well as the track with the teeth and slots.

In FIG. 5, the pitch linkage 22 is in the pitched forward position 28, and the slide 12 is in the access zone, meaning that the slide is in a very forward position to allow passengers access to the seats behind the present seat. Once access to the more rearward seats is no longer desired, the slide 12 can be slid back into the comfort zone in the direction 62. FIG. 6 shows the slide 12 in the comfort zone after the slide has been in the access zone. The pitch linkage 22 is still in the pitched forward position 28. Before the slide 12 can reach the most rearward position of the comfort zone, a pitch hook 64 of the pitch mechanism 30 engages with a pitch obstacle 66, also of the pitch mechanism 30. This engagement moves the pitch mechanism 30 into an unlocked position as shown in FIG. 7. The pitch linkage 22 is then unlocked and is free/allowed to move into the reclined position 24.

The seat also has a rearward stop 68 that selectively blocks and unblocks movement of the slide 12 in the rearward direction. In a preferred embodiment, the rearward stop 68 includes a rearward rocker 74 with a rearward hook 70 and a rearward obstacle 72. There is a rearward stop mechanism between the rearward stop 68 and the pitch linkage 22. When the pitch linkage 22 is in the pitched forward position 28, the rearward stop 68 is moved into a blocking state where the rearward stop 68 would block rearward movement of the slide when the rear hook 70 engages the rear obstacle 72. The rearward stop mechanism can be embodied by a cam surface or surfaces on the pitch linkage 22 and the rearward rocker 74. Movement of the pitch linkage 22 can have a surface of the pitch linkage 22 contact the surface of the rearward locker 74, so that the rearward locker 74 pivots in the clockwise direction of FIG. 6 and lowers the rearward hook 70 into a position where it can engage with the rearward obstacle 72 when the slide 12 moves in the rearward direction 62.

In a preferred embodiment, the rearward rocker 74 is indirectly moved by the pitch linkage 22 through the forward rocker 48. The forward rocker 48 has a second rocker surface 43 which interacts with a rearward rocker surface 73. The interaction between the second rocker surface 43 and the rearward rocker surface 73 causes the rearward rocker 74 to pivot about the pivot point 49. As shown in FIG. 9, when the pitch linkage 22 is in the pitched forward position 26 the surfaces of the linkage and rockers places the forward hook 40 into an unengaged position, and the rearward hook 70 into an engagement position. Likewise, when the pitch linkage 22 is moved into the reclined position these surfaces, 38A, 43 and 73 of the linkage and rockers lowers the forward hook 40 into an engagement position, and raises the rearward hook 70. In particular, in the embodiment of FIG. 9, moving the pitch linkage 22 in a counterclockwise direction causes the rocker 48 to rotate in the counterclockwise direction, which lowers the forward hook 40. Counterclockwise rotation of forward rocker 48 causes surface 43 to push against the surface 73, which causes a rearward rocker 74 to lift the rearward hook 70 out of its engagement position.

The rearward stop mechanism can also be embodied with other structure such as pins in a groove, gearing, cables and/or pushrods, etc.

Very often when the seat is moved from the access zone to the comfort zone, it is done with great speed, and if the operator is not careful, the seat back 46 can interfere with the knees of the person in the rearward seat. The rearward stop 68 is arranged so that as the seat is moved in the rearward direction 62, the rearward stop 68 stops the seat before the slide 12 reaches the most rearward position of the comfort zone. The pitch lock 30 is arranged to unlock the pitch linkage 22 just before the rearward stop 68 stops movement of the slide in the rearward direction 62. Momentum from movement of the seat in the rearward direction 62 then assists in moving the seat back 46, and the pitch linkage 22 into the reclined position 24, as shown in FIG. 7 especially by unpitching arrow 76. In this way, the seat, and especially the seat back 46 is stopped before it can go all the way to the most rearward position, and possibly stop any harm caused from going to the most rearward position.

Once the pitch linkage 22 returns to the reclined position 24, the rearward stop 68 is moved in unlocking/release direction 78 into the unlatched position, and the track latch 28 moves in direction 80 into the latched position through their respective mechanisms for interaction with the pitch linkage 22. The track latch adjustment bar 36 also moves in the downward direction 82 which allows the track latch adjustment bar 36 to again control the track latch 28. The track latch 28 then locks the slide 12 to the track 10 in one of the plurality of track positions. The occupant can then move the track bar 36 to adjust the slide 12 to any of the track positions, including the most rearward position, since the rearward stop 68 is in the unlatched position.

Figure 10:
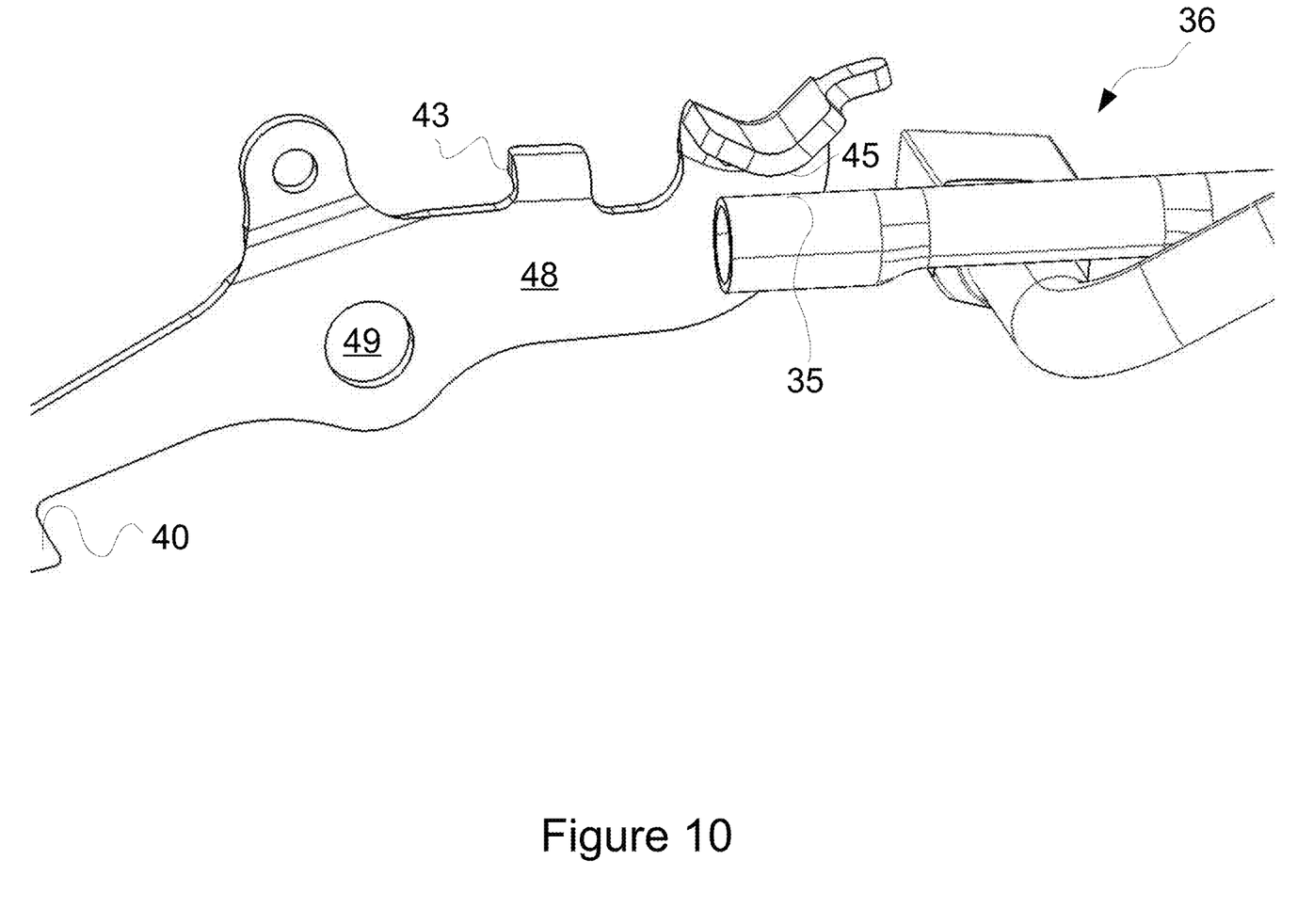
FIG. 10 is a view of the forward rocker and the track latch adjustment bar.

The track latch mechanism that controls the track latch 28 based on the position of the pitch linkage 22 preferably includes the forward rocker 48, as shown in FIG. 10. FIG. 10 is a view similar to FIG. 9, but from the opposite side. The forward rocker 48 has a third rocker surface 45 which interacts with a track bar surface 35. When the pitch linkage 22 moves the forward rocker 48, contact between the third rocker surface 45 and the track bar surface 35 causes movement of the track adjustment bar 36, and this performs the selective control of the track latch 28. When the pitch linkage 22 is in the pitched forward position 26, the third rocker surface 45 pushes down on the track bar surface 35 which through pivoting action is similar to an operator lifting the distal end of the track latch adjustment bar 36. When this distal end of the track latch adjustment bar 36 is lifted, the track latch 28 unlocks the slide 12 from the track 10 and the slide 12 is free to slide forwards and backwards. Likewise, when the pitch linkage 22 is moved into the reclined position, rocker 48 moves counterclockwise in FIG. 10 which moves third rocker surface 45 in an upwards direction, which moves the track latch adjustment by 36 into a locked position where it can be selectively operated by the operator. Other embodiments of the track latch mechanism can include other structures, such as pins in a groove, gearing, cables and/or pushrods, etc.

Figure 11:
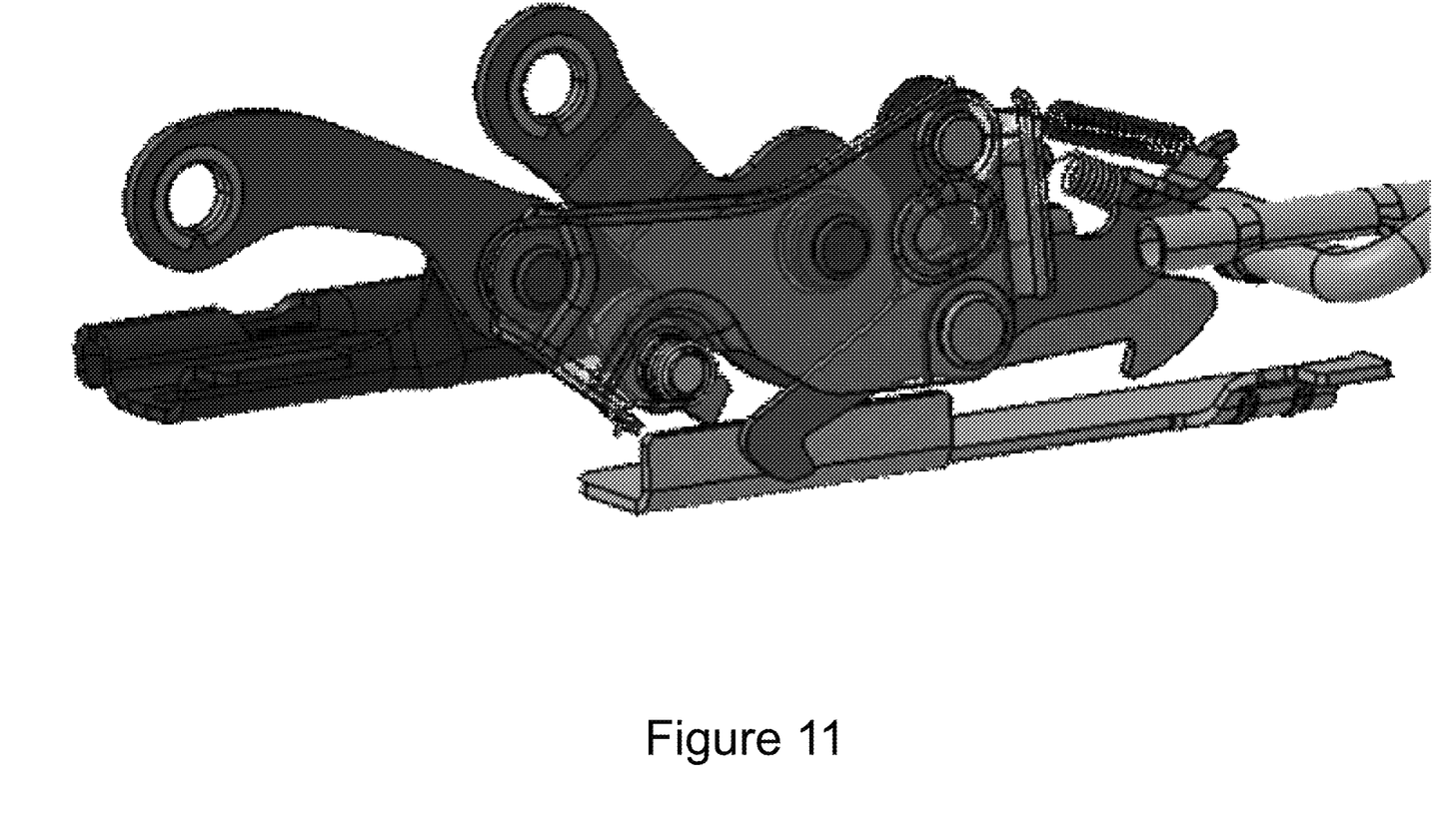
FIG. 11 is an alternate embodiment of the seat mechanism in a first state.
Figure 12:
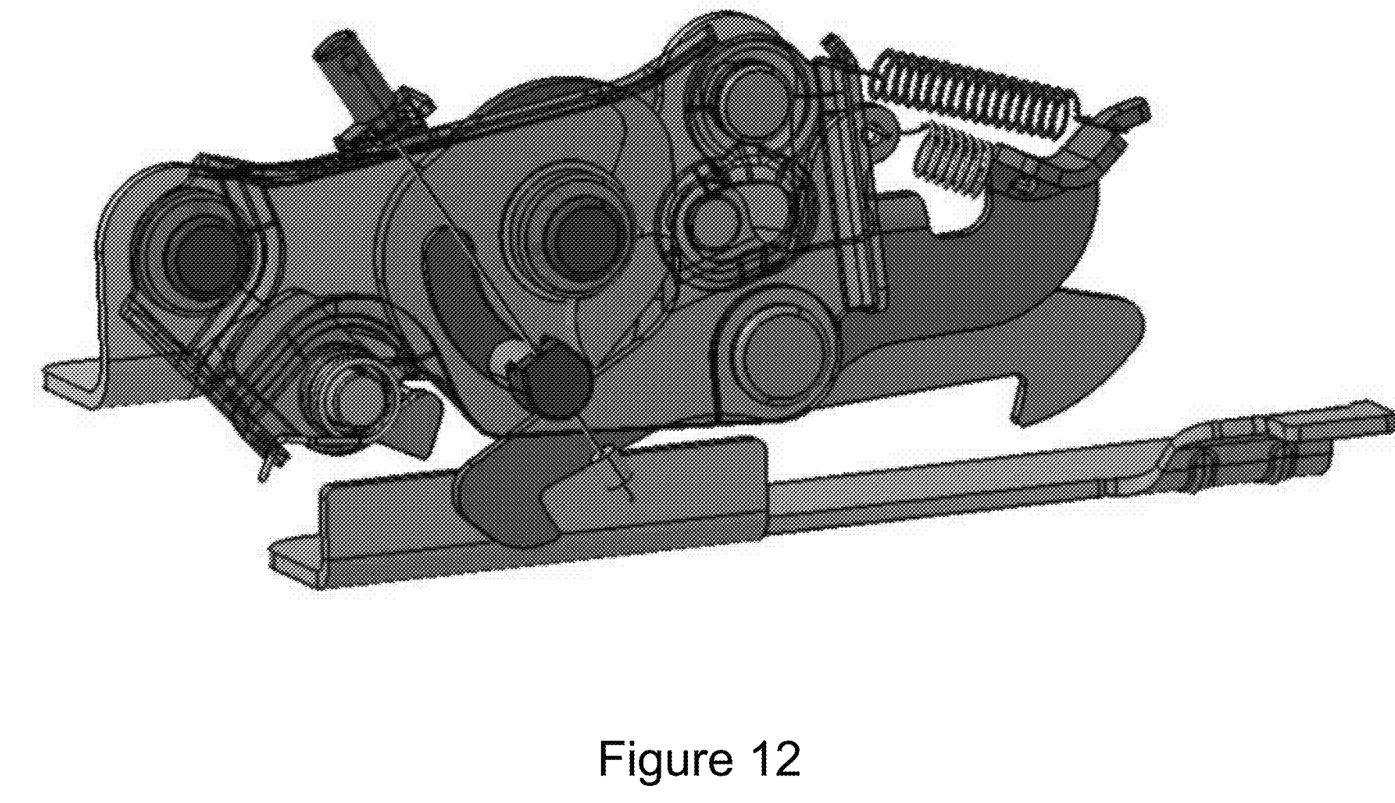
FIG. 12 is the alternate embodiment of FIG. 11 in a second state.

FIGS. 11 and 12 show an alternate embodiment of the slide and track with all the associated mechanisms and structures to perform the functions previously described. Functionally only the pitch link is changed, the actuation is changed for pitch rotation of the seat to seat back tip motion which pulls a bowden cable that is attached to the modified pitch link.

The design solution is a modular design solution that incorporates all targeted functions that can be actuated by both seat pitching forward and seat back tip/reclining with the changing/moving of a single component. This is preferably done by the slide 12 including a slide plate 82, and the pitch linkage 22, the forward stop 32, the rearward stop 68, and the pitch lock 30 being pivotally mounted to the side plate 82. The forward obstacle 42, the rearward obstacle 72 and the pitch obstacle 66 are mounted adjacent a same transverse side of the track 10, in longitudinal alignment and under the slide 12 to provide the compact single arrangement. The arrangement functions are controlled by rotation of the pitch link/linkage 22, ensuring the relationship of the functions is maintained with minimal variation.

While specific embodiments of the invention have been shown and described in detail to illustrate the application of the principles of the invention, it will be understood that the invention may be embodied otherwise without departing from such principles.

LIST OF REFERENCE CHARACTERS

10 track
12 slide
14 first longitudinal end
16 second longitudinal end
18 seat cushion
20 seat back
22 pitch linkage
24 recline position
26 forward position
28 track latch
30 pitch mechanism
32 forward stop
34 recliner mounting plate
35 track bar surface
36 track latch adjustment bar
37 forward rocker pin
38 pitch link control profile
39 first rocker surface
40 forward stop hook
42 forward stop obstacle
43 second rocker surface
44 seat cushion/base
45 third rocker surface
46 seat back rest
48 forward rocker
49 forward rocker pivot point
50 manual seatback release
52 track bar adjustment movement direction
54 forward rocker rotate direction
56 pitch linkage movement direction
58 pitch cam surface
60 pitch cam lock position
62 slid back into the comfort zone
64 pitch hook
66 pitch obstacle
68 rearward stop
70 rearward hook
72 rearward obstacle
73 rearward rocker surface
74 rearward rocker
76 unpitching arrow
78 rearward stop moved
80 track latch moves
82 side plate
84 tooth
86 slot
88 forward direction

What is claimed is:

1. An adjustable seat mechanism for a seat with a seat cushion and a seat back, the seat mechanism comprising:
a track having a first longitudinal end, a second longitudinal end and an overall slidable length, said overall slidable length having a comfort range and an entry zone, said entry zone being arranged between said comfort zone and said first longitudinal end;
a slide movably mounted on said track to slide along said overall length, said the slide being adapted to support the seat cushion;
pitch linkage mounted on said slide and adapted to support the seat back, said pitch linkage pivotally to connect the seat back to the slide between a recline position and a forward position;
a track latch arranged on said slide and to fix said slide to said track in a plurality of track positions in said comfort zone;
a forward stop on said slide and selectively to block said slide from moving from said comfort zone to said entry zone, said forward stop being movable between a stop position and a release position, said stop position to block said slide from moving from said comfort zone to said entry zone, said release position not blocking said slide from moving from said comfort zone to said entry zone;
a forward stop mechanism to move said forward stop into said stop position when said pitch linkage is in said recline position and said slide is in said comfort zone.

2. A seat mechanism in accordance with claim 1, wherein:
said forward stop mechanism biases said forward stop into said stop position when said pitch linkage is in said recline position.

3. A seat mechanism in accordance with claim 1, wherein:
said track latch is movable between a latch position and an unlatch position, said latch position to fix said slide to said track in one of said plurality of track positions, said unlatch position not to fix said slide to said track in one of said plurality of track positions;
a latch mechanism moves said track latch into said unlatch position when said pitch linkage is in said forward position.

4. A seat mechanism in accordance with claim 3, wherein:
said latch mechanism biases said track latch into said latch position when said pitch linkage is in said recline position.

5. A seat mechanism in accordance with claim 4, wherein:
said track latch includes a tooth member to interact with a plurality of slots to fix said slide to said track in said plurality of track positions, said tooth member being arranged on one of said track and said slide, said plurality of slots being arranged on the other of said track and said slide;
said latch mechanism includes a cam surface between said track latch and said pitch linkage, movement of said pitch linkage to move said cam surface of said latch mechanism to move one of said tooth member and said plurality of slots.

6. A seat mechanism in accordance with claim 1, wherein:
a pitch mechanism blocks movement of said pitch linkage from said forward position to said recline position when said slide is in said entry zone.

7. A seat mechanism in accordance with claim 1, further comprising:
a rearward stop on said slide and selectively to block said slide from moving to said second longitudinal end, said rearward stop being movable between a stop position and a release position, said stop position of said rearward stop to block said slide from moving to said second longitudinal end, said release position of said rearward stop not to block said slide from moving to said second longitudinal end;

a rearward stop mechanism moving said rearward stop into a respective said stop position when said pitch linkage is in said forward position and said slide is in said comfort zone.

8. A seat mechanism in accordance with claim 7, wherein:

said rearward stop mechanism moves said rearward stop into a respective said release position when said pitch linkage is in said recline position.

9. A seat mechanism in accordance with claim 7, wherein:

said rearward stop includes a rearward hook and a rearward obstacle, said rearward hook and said rearward obstacle being arranged to have said rearward hook engage with said rearward obstacle in a respective said stop position;

said rearward stop mechanism includes a rearward rocker with said rearward hook being arranged on said rearward rocker, said rearward rocker with said hook being arranged on said slide;

said rearward rocker includes a rear cam surface between said rearward stop and said pitch linkage, said rear cam surface in said stop position of said rearward stop to block said pitch linkage from moving from said forward position to said recline position.

10. A seat mechanism in accordance with claim 1, wherein:

said forward stop includes a hook and a forward obstacle, said hook and said forward obstacle being arranged to have said hook engage with said obstacle in a respective said stop position, said hook and said forward obstacle being arranged to not have said hook engage with said obstacle in a respective said release position, said forward obstacle being arranged on said track;

said forward stop mechanism includes a cam surface between said forward stop and said pitch linkage, movement of said pitch linkage to move said cam surface to move said hook;

said forward stop mechanism includes a rocker with said hook being arranged on said rocker, said rocker with said hook being arranged on said slide.

11. A seat mechanism in accordance with claim 1, wherein:

said slide includes a side plate;

said pitch linkage, said forward stop, a rearward stop, and a pitch lock are pivotally mounted to said side plate;

a forward obstacle, a rearward obstacle and a pitch obstacle are mounted said adjacent a same transverse side of said track, in longitudinal alignment and under said slide.

* * * * *